(12) United States Patent
Schieferstein

(10) Patent No.: US 6,293,678 B1
(45) Date of Patent: Sep. 25, 2001

(54) SYSTEM OF VISUAL RETROREFLECTIVE AIRCRAFT APPROACH RUNWAY PANELS

(76) Inventor: Wesley E. Schieferstein, 14738 Russell La., Novelty, OH (US) 44072

( * ) Notice: Subject to any disclaimer, the term of this patent is extended or adjusted under 35 U.S.C. 154(b) by 0 days.

(21) Appl. No.: 09/599,750

(22) Filed: Jun. 23, 2000

(51) Int. Cl.$^7$ .................................................... G02B 5/124
(52) U.S. Cl. ...................... 359/530; 359/527; 340/947; 340/953
(58) Field of Search ..................... 359/515, 527, 359/529–532, 547, 551, 552; 340/947, 948, 953, 952, 954

(56) References Cited

U.S. PATENT DOCUMENTS

| | | |
|---|---|---|
| 3,771,120 | 11/1973 | Bonzaoli et al. . |
| 3,813,657 | 5/1974 | Henry . |
| 3,875,551 | 4/1975 | Young . |
| 4,210,930 | 7/1980 | Henry . |
| 4,449,073 | 5/1984 | Mongoven et al. . |
| 4,521,836 | 6/1985 | Puttemanns et al. . |
| 4,554,544 | 11/1985 | Task . |
| 4,924,364 | 5/1990 | Pannier . |
| 5,136,288 | 8/1992 | Briatte . |
| 5,175,645 * | 12/1992 | Bennett et al. ........................ 359/530 |
| 5,208,601 | 5/1993 | Hart . |
| 5,335,112 * | 8/1994 | Bennett et al. ........................ 359/530 |

\* cited by examiner

Primary Examiner—James Phan
(74) Attorney, Agent, or Firm—Joseph H. Taddeo (57) ABSTRACT

The present invention relates primarily to an aircraft approach and landing system using passive retroreflective panels strategically placed along both sides of a landing strip or runway. The retroreflective panels comprise pairs of color-coded orange panel markers indicating the touchdown zone and singly, the remainder of the landing strip. The array of reflective elements are placed adjacent to the runway path so that the array produces a left/right reflected beam envelope within which an aircraft may be centered in order to maintain a desired landing vector. Upon installation of the reflector panel elements, each panel can be tilted with respect to the runway surface at an angle corresponding to the glide slope to produce a visual reflective beam aligned to the desired glide slope angle. The retroreflective sheeting of the preferred embodiment will provide a highly visible fluorescent component, where these panels will render suitable and effective utility in daytime operation, as well as, in nighttime use. The strategic placement dual sided panels along both sides of a landing strip, symmetrical from beginning to end, allows for an aircraft landing strip that will accommodate an aircraft to approach and land from either direction; single sided panels accommodates the aircraft unidirectionally.

21 Claims, 11 Drawing Sheets

SYSTEM OF VISUAL RETROREFLECTIVE AIRCRAFT APPROACH RUNWAY PANELS

FIELD OF THE INVENTION

The present invention relates primarily to aircraft landing approach and guidance systems, and more particularly, to an aircraft approach landing system using passive retroreflective panels strategically placed along both sides of a landing strip or runway.

BACKGROUND OF THE INVENTION

Aids to navigation are a critical element in the air traffic control system. The navigation function needs to be satisfied by a variety of technologies to supplement destination finding when weather or ambient light limits visual references.

The earliest navigation aids were lighted beacons placed along the ground; these suffered obvious problems during adverse weather and were replaced by radio direction-finding equipment. The radio technologies are able to transmit the heading and distance to an intended destination.

These aircraft-mounted technologies are supplemented by air route surveillance radar, which monitors aircraft within each designated sector of the air route traffic control system. The radar-based systems form the backbone of the navigation aids for privately owned aircraft and small passenger-carrying planes. Major commercial jets are now supplied with inertial navigation units, which allow an aircraft to independently navigate to a destination. A computer and gyroscope are used to sense direction and, with speed sensors, track direction and distance to the destination. The navigation units can fly virtually automatically until in the vicinity of an airport—at which time the pilot and controller interact to safely control the landing.

Only the simplest airfields are designed for operations conducted under visual meteorological conditions (VMC). These facilities operate only in daylight and the only guidance they are required to offer is a painted runway centerline and large painted numbers indicating the magnetic bearing of the runway. Larger commercial airports, on the other hand, must also operate in the hours of darkness and under instrument meteorological conditions (IMC), when horizontal visibility is 650 yards or less and the cloud base (or "decision height") is 65 yards or lower. In order to assist aircraft in approaches and takeoffs and in maneuvering on the ground, such airports are equipped with sophisticated radio navigational aids (navaids) and visual aids in the form of lighting and marking.

A Visual Assault Zone Marker Panel (VAMP), Model C, is typically used for C-17 operations. The "C" Model is the high velocity VAMP designed for use with aircraft that generate a maximum take-off blast (from either a jet or prop) that is greater than 200 mph. These VAMP's are constructed of a cerise (420 denier nylon) fabric panel, whose dimensions are 17 inches high by 72 inches long. This panel is reinforced around its entire outer edge by a two-inch-wide (1000# test) nylon webbing that is sewn into the colored panel material. Three 2-inch webbing loops are evenly spaced and sewn to each of the 17-inch sides. Additionally, there are two 20-inch webbing stiffeners evenly opened along the bottom edge of the fabric panel. There is a 0.3125-inch inside diameter (ID) brass-coated steel grommet through which bungee cords are used to tether to aluminum stakes.

Disclosed are several visual aircraft runway panels that have been in use for several years. Examples of such prior art are shown in the examples that follow.

U.S. Pat. No. 5,208,601, granted Nov. 4, 1993, to G. E. Hart, discloses an all-weather precision landing system for aircraft in remote areas. This all-weather aircraft landing system includes a plurality of ground based passive 90 degree dihedral reflectors for producing two-bounce reflected signals without ground reflections, and an airborne radar system.

U.S. Pat. No. 5,136,288, granted Aug. 4, 1992, to L. M. Briatte, relates to a method and an installation providing an aircraft with alignment guidance during the approach stage. At least three flashing lights are disposed on either side of the runway and directed towards an approaching aircraft. The beam direction and timing of the light flashes are such that the pilot of the aircraft lying above the axis of the runway sees the two lights closest to the runway flash simultaneously.

U.S. Pat. No. 4,210,930, granted Jul. 1, 1980, to R. D. Henry, discloses an aircraft approach system with simulated display of runway lights and glide slope indicator, using an airborne image camera, its respective scan plate and an image cathode ray tube (CRT) display.

The prior art recited above does not teach of the novel advantages that are found in the present invention. Several teach of navigational aids that use sophisticated electronic equipment, such as CRT presentations, whereas some use fluorescent fabric panels as visual markers. Still others use a series of flashing lights to indicate the central axis of the landing strip.

SUMMARY OF THE INVENTION

The present invention relates primarily to a novel aircraft landing approach and guidance system using passive retroreflective panels strategically placed along both sides of an airport runway or landing strip for defining underrun, touchdown, landing and overrun zones. Four pairs of panels, where each pair is laterally spaced 6 feet apart, define the touchdown landing zone by being placed in each corner of the zone. Singly placed retroreflective panels, symmetrically placed further down on both sides of the runway, are mounted at a distance between them that does not exceed 1000 feet, but is greater than 500 feet apart.

Each panel is made from a sheet of aluminum, to which is adhered on both front and rear surfaces, fluorescent orange retroreflective sheeting. The panel is subsequently bolted to a plurality of upright mounting stanchions, preferably seven stanchions. At the midpoint of each stanchion, approximately at the base of each panel, are frangible fittings. Attached to the bottom of the frangible fittings are the spaded tines that are used to secure and maintain the placement of each runway panel.

Applying the gelatinous retroreflective sheeting to both sides of the aluminum panel permits the panels to be used on runway systems that are bi-directional, where the landing approach can be made from opposite directions. To accomplish a landing from opposite directions, the number of retroreflective panels is twice of that needed for a single approach landing strip, because of the symmetry in the panel placement locations.

In a second preferred embodiment of the present invention, the resinous retroreflective sheeting is applied only to the front surface of the runway panel. In this configuration, this single sided panel can be used in airstrip landing systems where the approach can be made from one direction only, thereby reducing the number of panels required to one-half, because of the non-symmetrical runway arrangement.

Accordingly, it is therefore an object of the present invention to provide a novel aircraft approach landing system using passive retroreflective panels strategically placed along both sides of a landing strip.

It is another object of the present invention to provide a novel aircraft approach landing system using passive retroreflective panels strategically placed along both sides of a landing strip having color-coded panel markers that divide the airport runway into a plurality of aircraft approach and landing zones to indicate the touchdown zone and subsequently, the remainder of the landing strip.

It is still another object of the present invention to provide a novel aircraft approach landing system using passive retroreflective panels strategically placed along both sides of a landing strip, comprising marker panels having rigid aluminum sheets covered with a wide angle prismatic lens retroreflective sheeting.

It is still yet another object of the present invention to provide a novel aircraft approach landing system using passive retroreflective panels strategically placed along both sides of a landing strip, comprising marker panels of less than 19 inches in height after being installed.

An additional object of the present invention is to provide a novel aircraft approach landing system using passive retroreflective panels strategically placed along both sides of a landing strip, comprising marker panels, whose stanchions have frangible fittings that separate upon forceful contact, thereby preventing damage to an approaching aircraft and to the panels, in the event of an accidental contact.

A final object of the present invention is to provide a novel aircraft approach landing system using passive retroreflective dual sided panels strategically placed along both sides of a landing strip, where the aircraft landing strip is symmetrical from beginning to end, which will allow an aircraft to approach and land from either direction.

These as well as other objects and advantages of the present invention will be better understood and appreciated upon reading the following detailed description of the preferred embodiment when taken in conjunction with the accompanying drawings.

BRIEF DESCRIPTION OF THE DRAWINGS

An embodiment of the present invention is shown by way of example with reference to the accompanying drawings that are attached herein.

DETAILED DESCRIPTION OF THE INVENTION

The present invention provides for a passive aircraft approach and guidance system that uses strategically placed retroreflective panels on both sides of an aircraft landing strip.

The final approach landing system utilizes a system of passive ground reflectors. The array of reflective elements are placed adjacent to the runway path so that the array produces a left/right reflected beam envelope within which an aircraft may be centered in order to maintain a desired landing vector.

Upon installation of the reflector panel elements, each panel can be tilted with respect to the runway surface at an angle corresponding to the glide slope to produce a visual reflective beam aligned to the desired, predetermined safe glide slope angle.

The retroreflective sheeting, as described herein, will provide a highly visible fluorescent component, where these panels will render suitable and effective utility in daytime operation, as well as, in nighttime use.

One embodiment of the present invention utilizes passive runway guidance panels having a retroreflective surface on the plane surfaces, both front and rear, for use in air strip landing systems that are bi-directional, where the landing approach can be made from either direction.

A second preferred embodiment of the present invention utilizes passive runway guidance panels having a retroreflective surface adhered to the front surface only, for use in air strip landing systems, where the approach can be made from one direction only.

Figure 1:
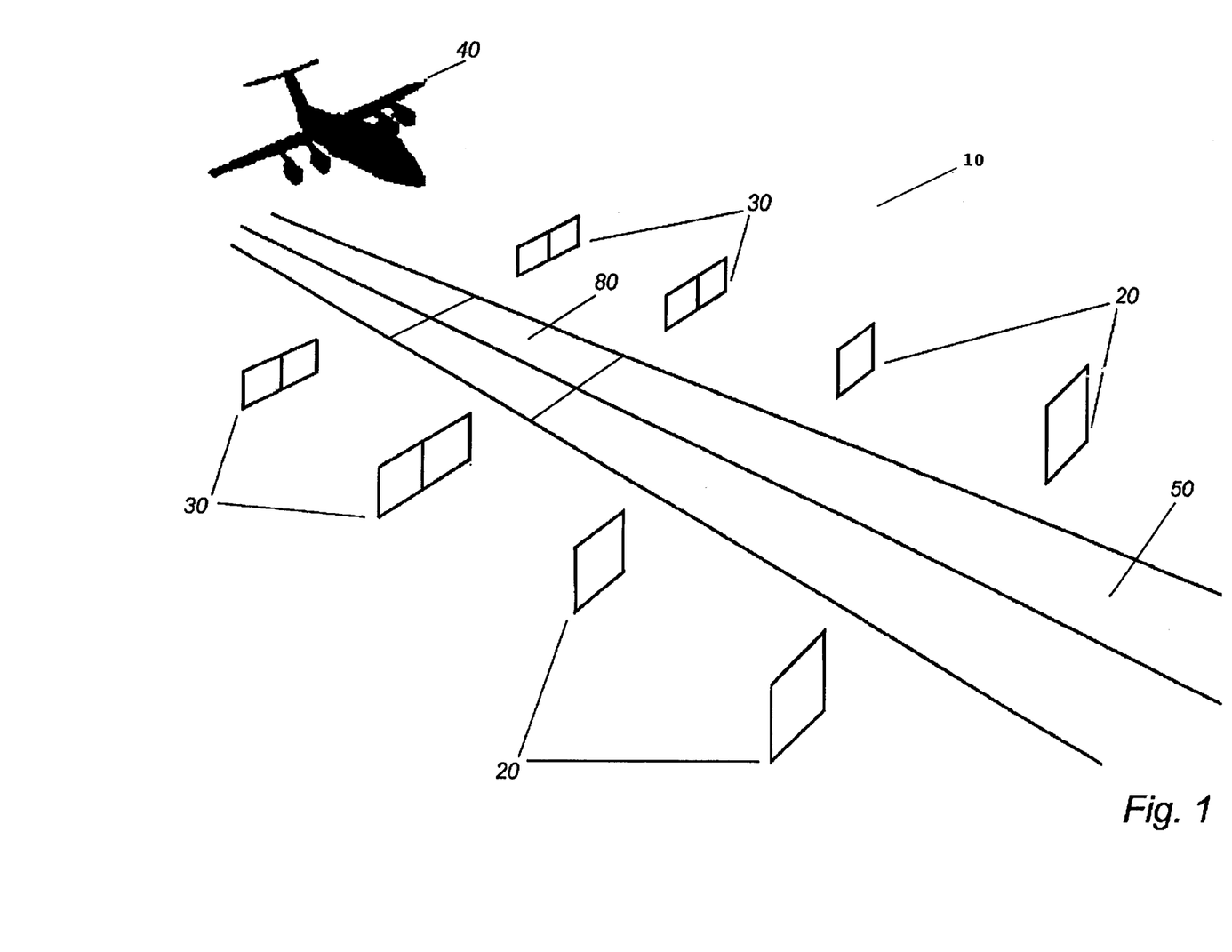
FIG. 1 is a prespective view of a typical aircraft approaching a landing airstrip having the newly designed retroreflective panels strategically placed on both sides of the landing strip.

There is shown in FIG. 1 a pictorial representation of the passive aircraft approach and guidance system 10 of the invention, with an aircraft 40, above and approaching the runway 50, where the retroreflective runway panels 20,30 of the present invention are positioned on both sides of the landing strip.

Figure 2:
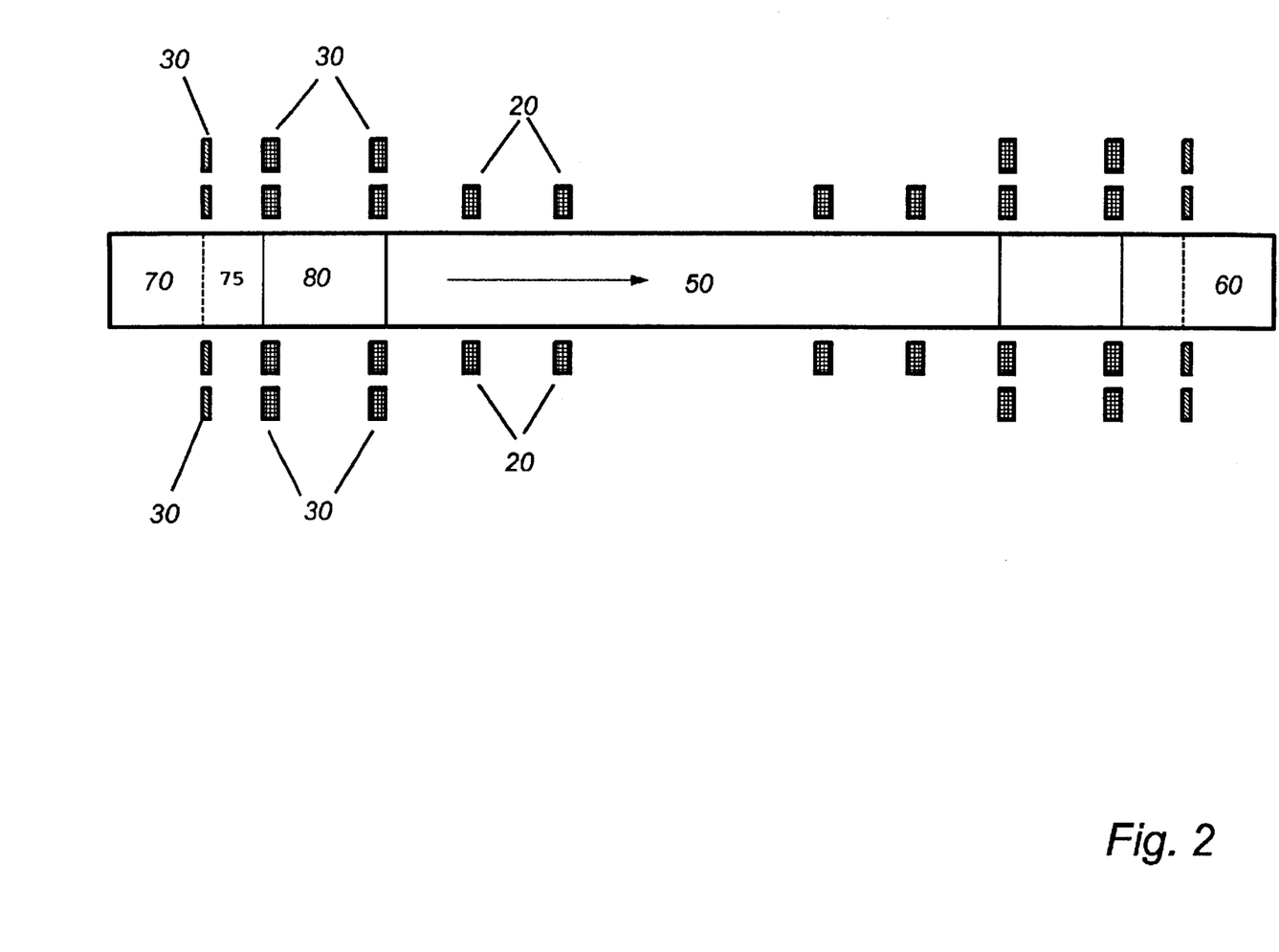
FIG. 2 is diagrammatic view of a typical airfield runway with a plurality of retroreflective panels arranged adjacent to the runway according to the present invention, showing the aircraft approach in a left-to-right direction.

As shown in FIGS. 1 and 2, and more particularly in FIG. 2, the pairs of retroreflective panels 30, laterally spaced approximately 6 feet apart and situated symmetrically on both sides of the landing strip 50, marks and identifies the four corners of the landing touchdown zone 80. The region preceding the touchdown zone 80 and the pre-touchdown zone is commonly referred to as an under-run zone 70. Two additional pairs of passive retroreflective panels 30 mark the end of the under-run zone 70.

Typically, the length of the under-run zone 70 is approximately 300-ft.; the length of the pre-touchdown zone 75 between the under-run zone 70 and the touchdown zone 80, is generally 100-ft.; and the length of the touch down zone 80, is approximately 400-ft. Following the touchdown zone 80, there are symmetrically placed on both sides of the runway, single pairs of retroreflective panels 20. These single retroreflective panels 20 are placed along the sides of the runway, spaced at a minimum longitudinal distance of 500-ft. (150 M.) and a maximum distance of 1000-ft. (300 M.) apart.

Figure 2A:
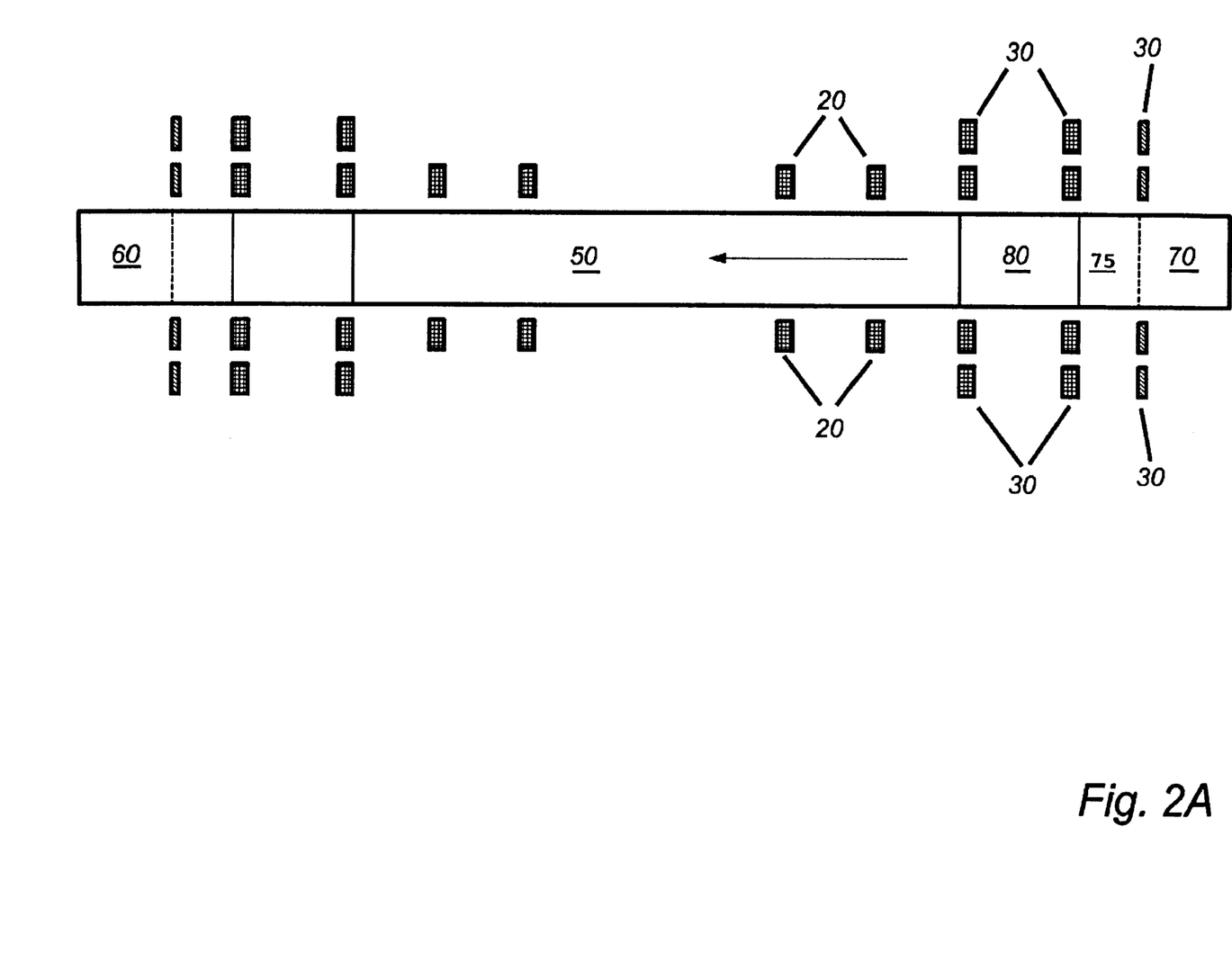
FIG. 2A is diagrammatic view of a typical airfield runway with a plurality of retroreflective panels arranged adjacent to the runway according to the present invention, showing the aircraft approach in a right-to-left direction.

When a landing is made from the opposite direction, the converse panel element arrangement is true, as shown in FIG. 2A.

Figure 3:
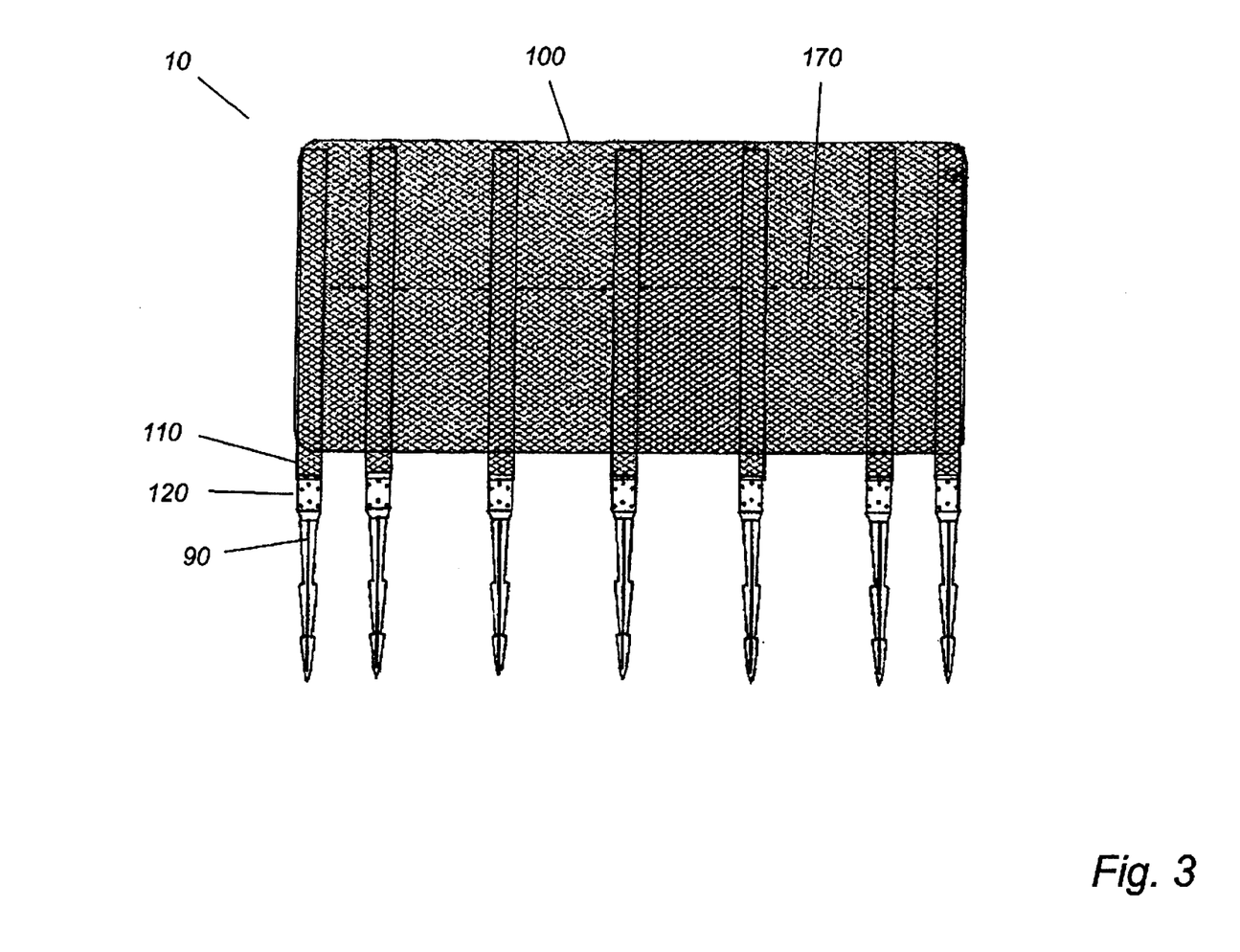
FIG. 3 is front elevational view of the newly designed retroreflective panel secured to the mounting stanchions.
Figure 4:
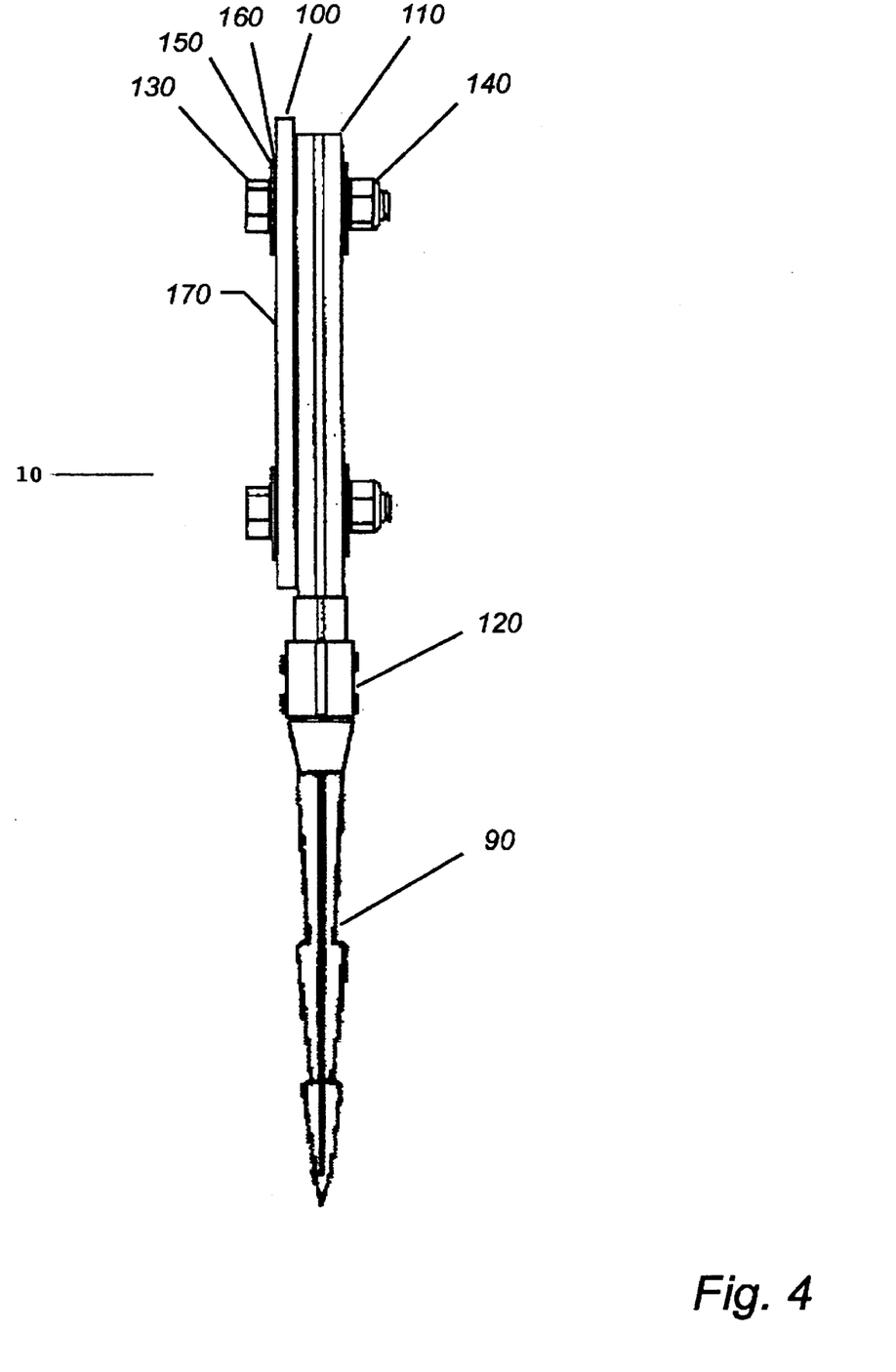
FIG. 4 side elevational view of the vertically mounted, single-sided retroreflective panel, further detailing the mounting stanchions including frangible fittings.

Turning now to FIGS. 3 and 4, there is shown, the newly design retroreflective runway panel 10: a front view and side view, respectively.

Each retroreflective panel is made from a sheet of aluminum, having a thickness of preferably 0.080 inches. The sheet of aluminum is preferably 72 inches wide and 17 inches high. When installed, the height of the entire assembly must be less than 19 inches. A height of 19 inches is desirable so that it is low enough to avoid being struck or causing damage to the jet pod, wing or other low point of the aircraft.

On the front surface of the aluminum sheet, there is adhered to fluorescent orange retroreflective sheeting. This resinous sheeting is preferably a Scotchlite™ Durable Fluorescent Diamond Grade Sheeting, Series 3924-G Orange.

3M™ Scotchlite™ Durable Fluorescent Diamond Grade Sheeting, Series 3924-G is a prismatic lens retroreflective sheeting. This sheeting is comprised of an interlocking pattern of prismatic lenses formed in a transparent synthetic resin, sealed, and backed with a pressure-sensitive adhesive and a blue poly liner. Properly applied to a prepared backing, this retroreflective sheeting will provide long-term service. The 3924-G sheeting is used primarily for rectangular shaped panels, such as used in the preferred embodiment of the present invention. This pressure sensitive adhesive sheeting is available in roll widths up to 36 inches in a fluorescent orange coloration.

It is recommended that this pressure sensitive adhesive sheeting be applied at room temperature for maximum adhesion.

After the retroreflective sheeting 170 is adhered to the aluminum panel 100, the completed panel is subsequently bolted to a plurality of upright mounting stanchions 110, which were previously covered with the retroreflective sheeting 170.

In the preferred embodiment, each of the retroreflective panel assembly's use seven stanchions. A minimum of seven stanchions for this sized panel is used to provide for high velocity applications. The panels of the present invention are designed for use with aircraft that generate a maximum take-off blast, from either a jet or prop that is greater than 200 mph. However, there can be fewer or more stanchions dependent upon the intended application and use.

Nylon washers 160 must be used between the heads of all twist fasteners (such as screw heads, bolts, or nuts) and the sheeting 170 to protect the sheeting from the twisting action of the bolt heads 130 or hex nuts 140.

Placed on the top of each nylon washer 160 is a 5/16" stainless steel flat washer 150. Two 5/16"-18×1.50" stainless steel hex head machine screws 130, together with two 5/16"-18 NyLok Hex Nuts secure the completed panel assembly to each of the stanchions.

At the midpoint of each upright stanchion 110, approximately at the base of each panel, is a frangible fitting 120. Attached to the bottom of the frangible fittings 120 are the spaded tines 90 that are used to secure and maintain the placement of each runway panel when imbedded in the earth.

Figure 4A:
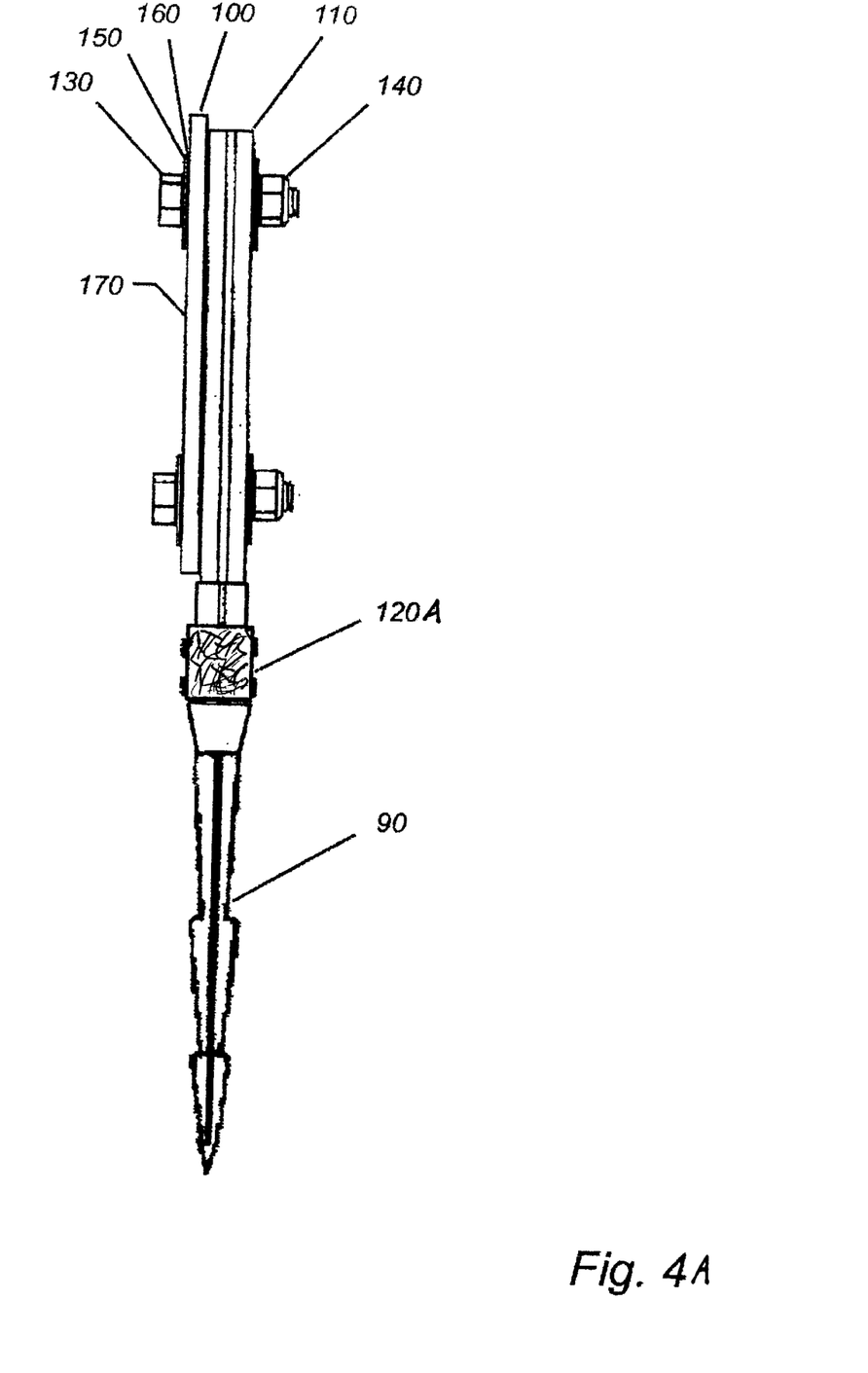
FIG. 4A is a side elevational view showing the retroreflective panel mounted on the stanchions with an elastomeric material.
Figure 4B:
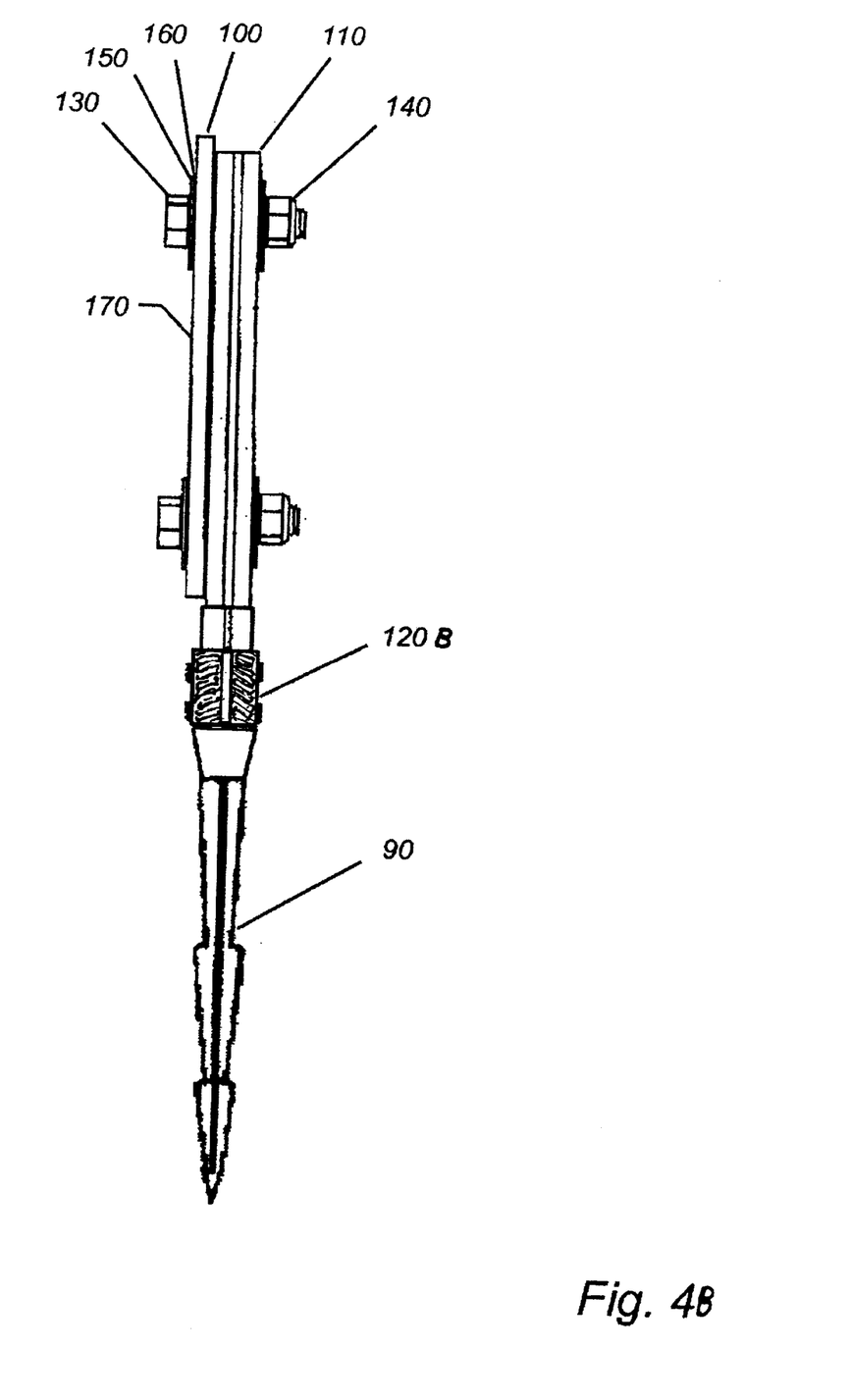
FIG. 4B is a side elevational view showing the retroreflective panel sustained on the stanchions using springs.

As shown in FIG. 4, frangible fittings 120 are provided in each upright stanchion, whereby the vertically mounted panel includes breakaway characteristics to prevent damage to an approaching aircraft should an accidental contact be made. According to FIG. 4A, each stanchion may alternately include elastomeric reboundable fittings 120A, whereby the panel assembly can fold downward if struck for preventing damage to an aircraft and the panel should an accidental contact be made, whereupon the panel assembly is biased for rotation back to the original upright position. In FIG. 4B, each of the panels is sustained on the stanchions using a spring assembly for resilience of the panel assembly upon impact with restoration to its originally installed position.

Wind shear or crosswind gusts may cause the descending aircraft to veer towards one of the retroreflective panels. If contact is made between a marker panel and the aircraft jet pod or wing, damage to either the aircraft or to the marker panel may result. The implementation of the frangible, elastomeric or spring fittings permits the panel assembly to either bend away consequent to minimal contact or to break away from its moored down position upon a heavy contact, thereby minimizing any damage done to either the panel or plane. If the reboundable fittings 120A, 120B are substituted for the frangible fittings, the panel assembly is adapted to bend upon a heavy contact with subsequent restoration to the originally fixed panel position.

Panels made with the above referenced retroreflective sheeting are suitable for use during daytime operation, as well as, operation during nighttime. In installations where greater intensity is needed, flood lamps, flashing lights or other light source can be placed in front of each panel to illuminate the surface of the panel for enhanced reflectivity.

In other installations, the use of color-coding each marker panel may be beneficial to the operation of the airstrip. There are several colors available to choose from the present series of sheetings.

Alternatively, a Long Distance Performance (LDP) Retroreflective Sheeting, such as, the 3M™ Scotchlit™ Diamond Grade™ LDP Reflective Sheeting Series 3970 may be used. The 3M Scotchlite™ Diamond Grade™ LDP Reflective Sheeting—3973 Red is a wide angle prismatic lens reflective sheeting designed for the production of durable traffic control panels and delineators that are exposed vertically in service. This sheeting is designed to provide higher sign brightness, than sheetings that use glass bead lenses. LDP sheeting provides brightness at long distances shown by the values at 0.1° and at high entrance angles. Applied to properly prepared panel backings, LDP sheeting provides suitable long-term service.

Figure 5:
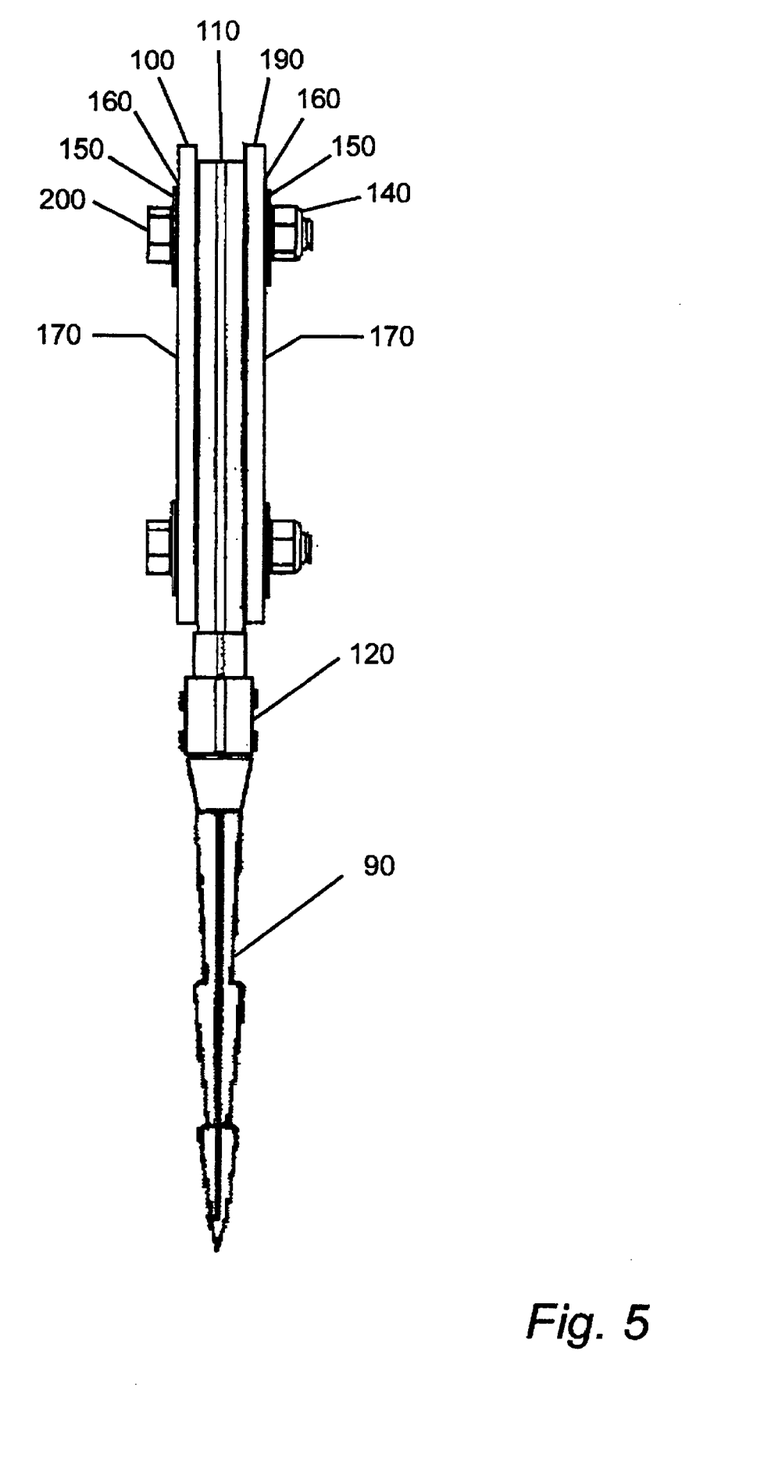
FIG. 5 is a side elevational view of the newly designed retroreflective panel, having dual retroreflective surfaces, both front and rear, and further detailing the mounting to the stanchions.

Turning now to FIG. 5, another alternative embodiment is shown. Passive runway guidance panels having a retroreflective surface on the plane surfaces, both front and rear, are used in an air strip landing system that is bi-directional, where the landing approach can be made from either direction.

In this configuration two retroreflective panels 100 and 190 are used, one on each side of the stanchion 110 with the retroreflective sheeting 170 adhered to the outer surface of the panels 100 and 190. Two 5/16"-18×2.50" stainless steel hex head machine screws 200, together with two 5/16"-18

NyLok Hex Nuts secure the completed panel assembly to each of the stanchions.

Figure 6:
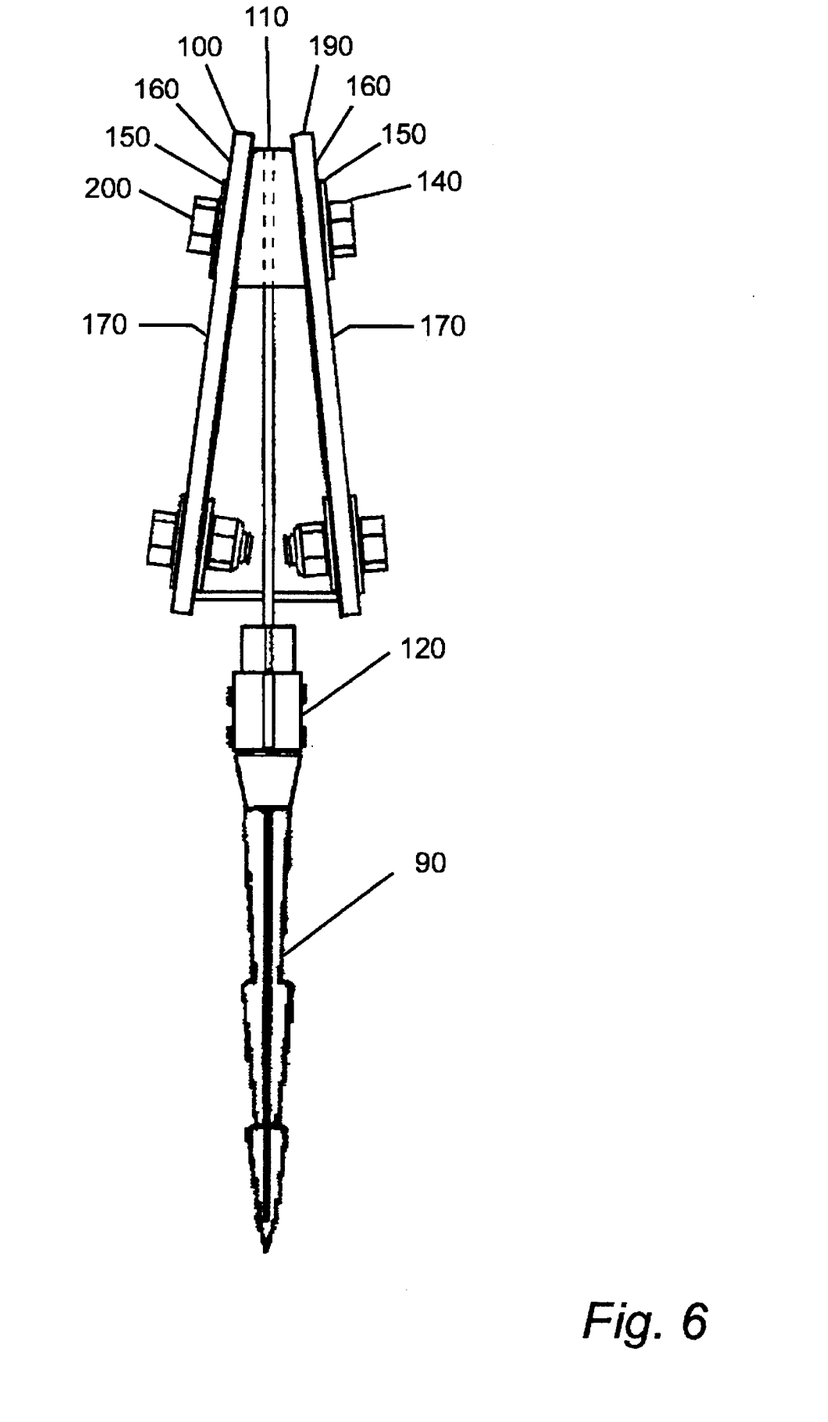
FIG. 6 is a side elevational view of the panel with each of the dual retroreflective surfaces angled upward to form a reflective beam envelope.
Figure 7:
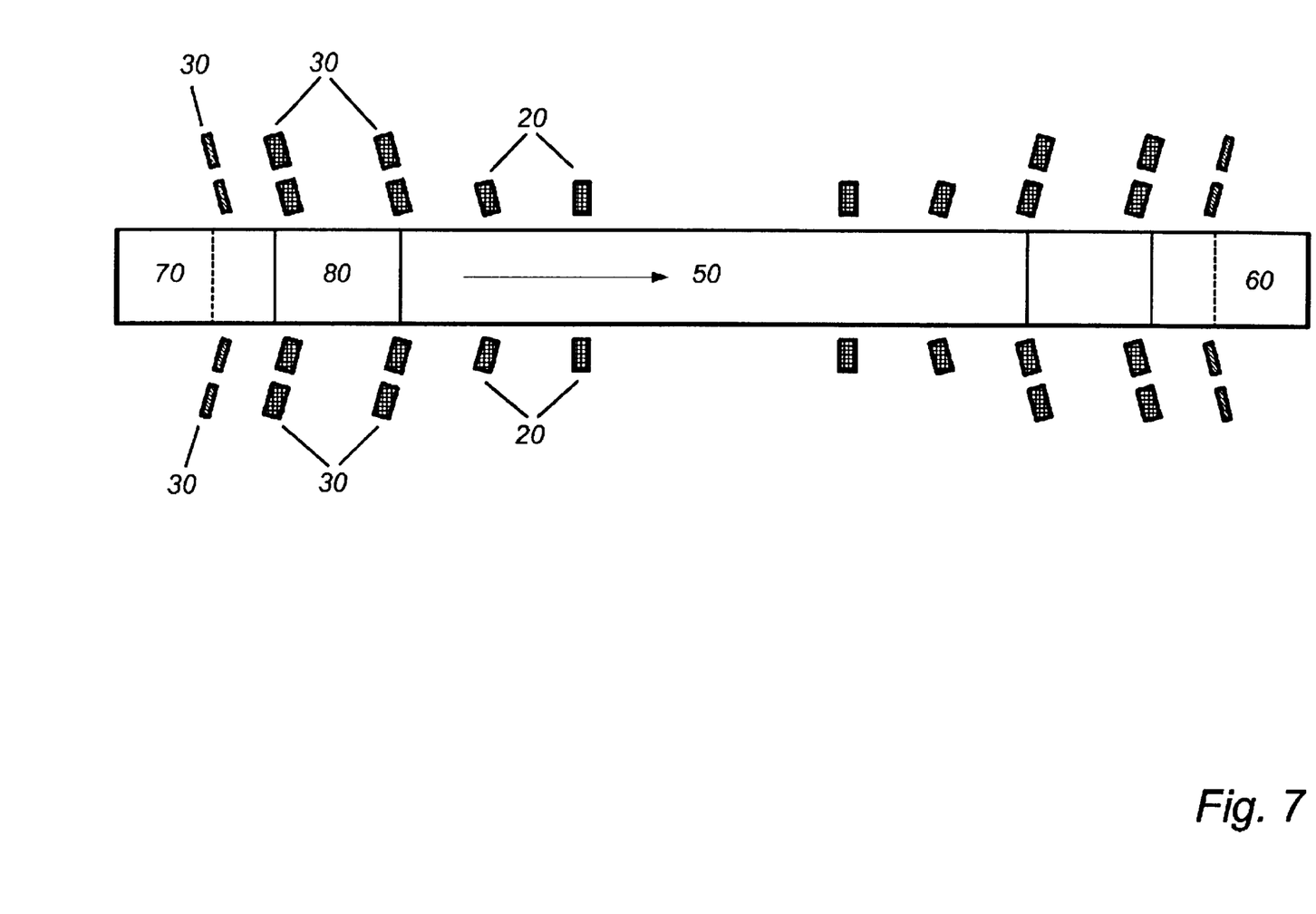
FIG. 7 is a top view of the runway divider panel system with an upwardly tilted, symmetrical parabolic alignment for retroflective convergence in a single point approximately two to four miles forward of the touchdown area for guidance on a left to right approach.

By reference to FIG. 6, a side elevational view of the panel indicates that each of the dual retroflective surfaces is angled upward for the formation a reflective beam envelope. Each panel constructed with an array of reflective elements is tilted inward and upward with respect to the runway to provide a left and a right reflected beam, each beam aligned to a predetermined glide slope angle to define a reflective beam envelope in which the aircraft may be centered to maintain a desired landing vector. Meanwhile, the plurality of panels is positioned in an essentially parabolic array, as in FIG. 7, with convergence of a reflected beam from each panel substantially at a single point within five miles, more preferably one to two miles, forward of the runway for guidance on a left to right approach.

Figure 7A:
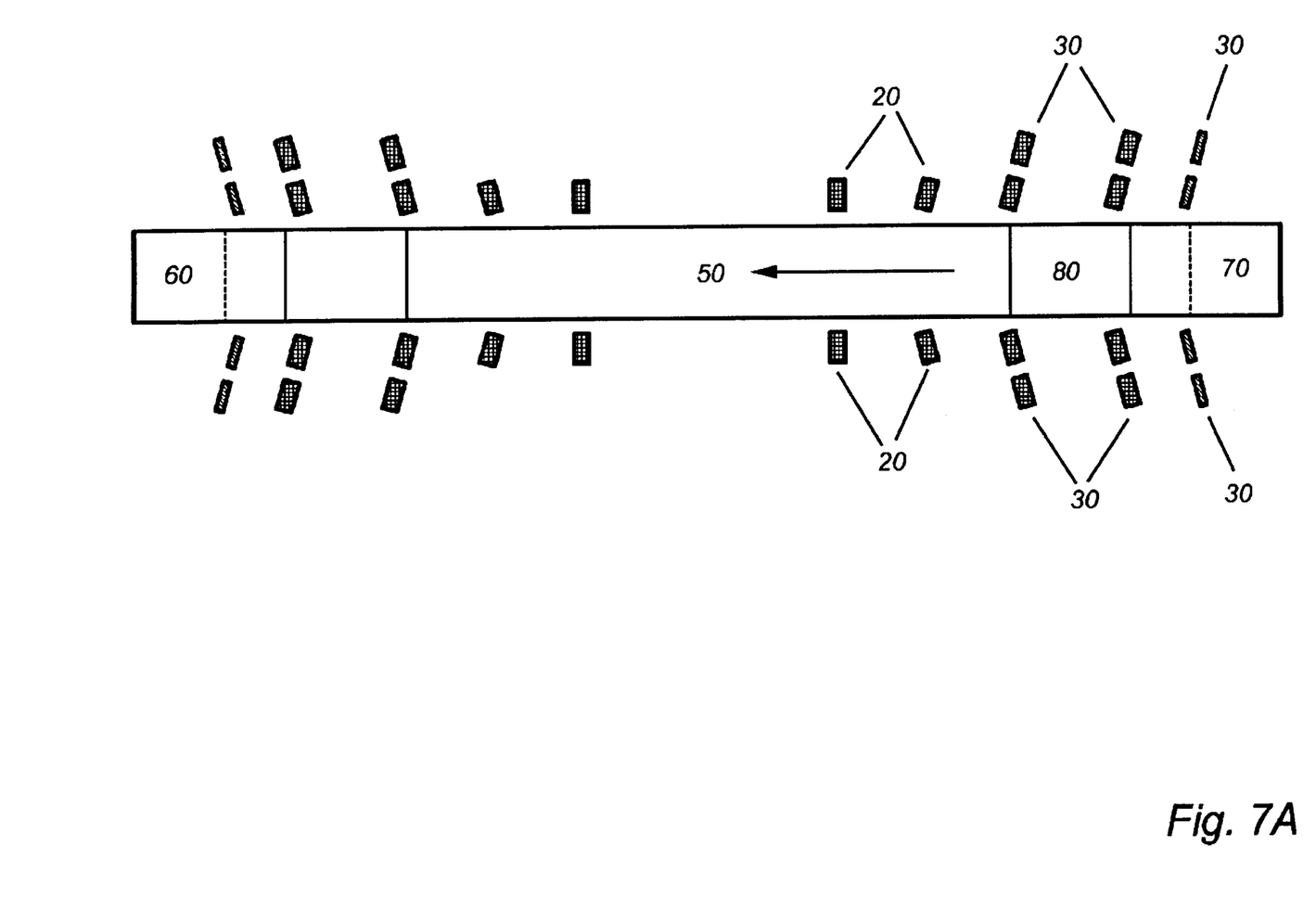
FIG. 7A is a view of the runway divider panel system with an upwardly tilted, symmetrical parabolic alignment for retroflective convergence in a single point approximately two to four miles forward of the touchdown area for guidance on a right to left approach.

FIG. 7A is a top view of the runway divider panel system with an upwardly tilted, symmetrical parabolic alignment for retroflective convergence in a single point approximately two miles forward of the touchdown area for guidance on a right to left approach.

It should be understood that there may be numerous other modifications, advances or changes that can be made to the present invention, such as the substitution of other materials, fasteners, placement of panels, or sheeting coloration's, but in doing so, it is intended that they should not detract from the true spirit of the present invention.

I claim:

1. A passive aircraft approach and landing guidance system to visually divide an airport runway for enhanced safety and assistance to aircraft pilots, the system comprising:
    a plurality of panels situated on both sides of the runway, each comprising a retroflective material and mounted on a plurality of stanchions, each stanchion stabilized in the ground;
    means of mounting each panel on the stanchions including a means for preventing damage to an approaching aircraft and to th panels in the event of an accidental contact between an aircraft and the panels;
    each panel comprising an array of reflective elements and each panel tilted inward and upward with respect to the runway to provide a left and a right reflected beam, each beam aligned to a predetermined glide slope angle to define a reflective beam envelope in which the aircraft may be centered to maintain a desired landing vector; and,
    the plurality of panels positioned in an essentially parabolic arrangement with convergence of the reflective beam from each panel substantially at a single point within five miles forward of the runway.

2. The passive airport approach and landing quidance system according to claim 1, wherein each panel retroflective material comprises a highly visible fluorescent component that provides a reflective utility for daytime and nighttime use.

3. The passive airport approach and landing guidance system according to claim 2, the plurality of panels comprising a first runway divider including two pair of panels, each pair positioned symmetrically on opposite sides of the runway on a substantially transverse line across the runway, defining an underrun zone; a second runway divider including two pair of panels, each pair positioned symmetrically on a transverse line across, and on opposite sides of, the runway, defining an aircraft touchdown zone; a third runway divider comprising a pair of panels, each panel of the pair positioned symmetrically on a transverse line across, on opposite sides of, the runway, defining the airstrip landing runway; and, a fourth runway divider comprising a pair of panels, each panel of the pair positioned symmetrically on a transverse line across, on opposite sides of, the runway, defining an airstrip overrun zone.

4. The passive airport approach and landing guidance system according to claim 3, wherein each pair of panels of the first and second runway dividers are spaced laterally apart a distance of essentially six feet apart.

5. The passive airport approach and landing guidance system according to claim 4, the means for mounting including a frangible fitting near a midpoint of each upright stanchion, proximate to a base of each panel.

6. The passive airport approach and landing guidance system according to claim 5, the means for preventing damage comprising a plurality of spaded tines attached to the bottom of each of the frangible fittings to secure the placement of each runway panel when imbedded in the earth for allowing each panel to break away from its moored position to prevent or minimize damage to aircraft or runway panel in the event of an accidental contact between an aircraft and the panels.

7. The passive airport approach and landing guidance system according to claim 6, the panel material comprising an aluminum sheet with a color coded retroreflective resinous sheeting adhered to the front and back surfaces of each aluminum sheet.

8. The passive airport approach and landing guidance system according to claim 7, the resinous sheeting comprising a fluorescent orange retroreflective material.

9. The passive airport approach and landing guidance system according to claim 8, the retroreflective material comprising a prismatic lens retroreflective sheeting.

10. The passive airport approach and landing guidance system according to claim 9, said retroflective sheeting on a front panel surface only for use in air strip landing sites where the approach can be made from one direction only, the sheeting formed by the steps of preparing an interlocking pattern of prismatic lenses, adding a transparent synthetic resin, sealing the resin, and backing the lenses sealed in resin with a blue poly liner having a PSA, and applying the sheeting to each panel at room temperature for maximum adhesion.

11. The passive airport approach and landing guidance system according to claim 10, wherein each panel comprises a rectangular aluminum sheet essentially 0.080" thick, 72" wide, 17" high; and, wherein the installed height of each panel mounted on its respective stanchions is less than nineteen inches.

12. The passive airport approach and landing guidance system according to claim 11, wherein each of the panels is bolted to a plurality of upright mounting stanchions previously covered with retroreflective sheeting.

13. The passive airport approach and landing guidance system according to claim 12, the plurality of stanchions preferably comprising seven stanchions to withstand takeoff or landing jet blast greater than 200 mph.

14. The passive airport approach and landing guidance system according to claim 13, further comprising nylon washers between the heads of all twist fasteners and sheeting to protect the sheeting from the torque applied to bolt heads; and, wherein a stainless steel flat washer is positioned above nylon washer.

15. The passive airport approach and landing guidance system of claim 14, further comprising a light source placed in front of each panel to illuminate the surface of the panel for enhanced reflectivity where a greater light intensity is required.

16. The passive airport approach and landing guidance system of claim 14, wherein the retroreflective material comprises Scotchlite™ Durable F1 Diamond Grade Sheeting, Series 3924-G Orange.

17. The passive airport approach and landing guidance system of claim 14, wherein the retroreflective material comprises a Long Distance Performance (LDP) Retroreflective Sheeting, identified as a 3M™ Scotchlite™ Diamond Grade™ LDP Reflective Sheeting Series 3970.

18. The passive airport approach and landing guidance system of claim 14, wherein the retroreflective material includes a wide angle prismatic lens reflective sheeting, 3M™ Scotchlite™ Diamond Grade™ LDP Reflective Sheeting Series 3970, for brightness at long distances shown by the values at 0.1° as well as at high entrance angles.

19. The airport approach and landing guidance system according to claim 14, each of the panels having retroflective material on both the front and rear surfaces, for use in bi-directional air strip landing systems.

20. The passive airport approach and landing guidance system according to claim 4, the means for mounting including a resilient elastomeric fitting near a midpoint of each upright stanchion, proximate to a base of each panel.

21. The passive airport approach and landing guidance system according to claim 4, the means for mounting including a fitting with springs near a midpoint of each upright stanchion, proximate to a base of each panel.

\* \* \* \* \*